United States Patent
Ganivet

(10) Patent No.: US 6,658,746 B2
(45) Date of Patent: Dec. 9, 2003

(54) NAVIGATION PLOTTER

(76) Inventor: Jean Luc Ganivet, 212 bd Sainte Marguerite, 13009 Marseille (FR)

( * ) Notice: Subject to any disclaimer, the term of this patent is extended or adjusted under 35 U.S.C. 154(b) by 8 days.

(21) Appl. No.: 09/852,309

(22) Filed: May 9, 2001

(65) Prior Publication Data

US 2002/0166246 A1 Nov. 14, 2002

(51) Int. Cl.$^7$ .............................................. G01C 21/20
(52) U.S. Cl. ..................... 33/1 SB; 33/494; 33/1 N; 33/431; 33/562; 33/457
(58) Field of Search ............................. 33/1 SB, 1 SD, 33/1 N, 1 CC, 424, 431, 483, 492, 494, 562, 563, 566, 457, 476

(56) References Cited

U.S. PATENT DOCUMENTS

| 1,245,304 A | * | 11/1917 | Zona | 33/1 N |
| 1,667,191 A | * | 4/1928 | Chapin | 33/476 |
| 1,930,478 A | * | 10/1933 | Jones | 33/1 SD |
| 2,352,405 A | * | 6/1944 | Polowe | 33/476 |
| 2,420,348 A | * | 5/1947 | Boriff | 33/476 |
| 2,545,935 A | * | 3/1951 | Warner | 33/1 SD |
| 3,013,337 A | * | 12/1961 | Hurwitz | 33/431 |
| 3,513,552 A | * | 5/1970 | Lagrosse | 33/476 |
| 3,621,578 A | * | 11/1971 | Novakovic | 33/1 SB |
| 3,863,347 A | * | 2/1975 | Banner | 33/1 SB |
| 4,120,091 A | * | 10/1978 | Borgato | 33/1 SB |
| 4,190,960 A | | 3/1980 | Warner | |
| 4,327,497 A | * | 5/1982 | Wyatt, Sr. | 33/431 |
| 4,456,821 A | * | 6/1984 | Harter | 235/61 NV |
| 4,499,665 A | * | 2/1985 | Davis | 33/1 B |
| 4,637,143 A | * | 1/1987 | Telles | 33/1 SB |
| 4,802,283 A | * | 2/1989 | Trump | 33/431 |
| 5,167,076 A | * | 12/1992 | Sump | 33/1 SD |
| 5,214,855 A | * | 6/1993 | Gibbs | 33/1 SD |
| 5,404,648 A | * | 4/1995 | Taylor, Jr. | 33/431 |
| 5,819,426 A | * | 10/1998 | Virtanen | 33/1 G |
| 6,158,135 A | * | 12/2000 | Rank | 33/1 B |

* cited by examiner

Primary Examiner—Diego Gutierrez
Assistant Examiner—Yaritza Guadalupe
(74) Attorney, Agent, or Firm—McHale & Slavin, P.A.

(57) ABSTRACT

A navigation plotter is made of a thin, flexible, transparent, light weight plastic with a straight-edge. The straight-edge has a distance scale. There is an reference point at the mid-point of the distance scale used to determine true course. The remainder of the periphery has angular markings in the form of a compass rose. A table gives speeds in the x axis and times in the y axis. The table is aligned with the distance scale. A compass rose and a holding pattern with entries are also depicted.

10 Claims, 6 Drawing Sheets

FIG: 1

PLOT'TIMER SPEED / TIME CHART

Select Gallery

Distances / Nautical Miles

| SPEED FUEL | 1 | 5 | 10 | 15 | 20 | 25 | 30 | 35 | 40 | 45 | 50 | 55 | 60 | 70 | 80 | 90 | 100 |
|---|---|---|---|---|---|---|---|---|---|---|---|---|---|---|---|---|---|
| 75 | 48" | 4 | 8 | 12 | 16 | 20 | 24 | 28 | 32 | 36 | 40 | 44 | 48 | 56 | 1 04 | 1 12 | 1 20 |
| 85 | 42" | 3 32 | 7 4 | 10 36 | 14 08 | 17 40 | 21 12 | 24 44 | 28 16 | 31 48 | 35 20 | 38 52 | 42 24 | 49 28 | 56 32 | 1 03 36 | 1 10 40 |
| 95 | 38" | 3 10 | 6 19 | 9 29 | 12 38 | 15 48 | 18 57 | 22 07 | 25 16 | 28 26 | 31 35 | 34 45 | 37 54 | 44 13 | 50 32 | 56 51 | 1 02 10 |
| 100 | 36" | 3 | 6 | 9 | 12 | 15 | 18 | 21 | 24 | 27 | 30 | 33 | 36 | 42 | 48 | 54 | 1 h |
| 105 | 34" | 2 52 | 5 44 | 8 36 | 11 28 | 14 20 | 17 12 | 20 04 | 22 56 | 25 48 | 28 40 | 31 32 | 34 24 | 40 28 | 46 12 | 51 56 | 57 40 |
| 115 | 31" | 2 37 | 5 14 | 7 51 | 10 28 | 13 05 | 15 42 | 18 19 | 20 56 | 23 33 | 26 10 | 28 47 | 31 24 | 36 38 | 41 52 | 47 6 | 52 20 |
| 125 | 29" | 2 25 | 4 50 | 7 15 | 9 40 | 12 05 | 14 30 | 16 55 | 19 20 | 21 45 | 24 10 | 26 35 | 29 | 33 50 | 38 40 | 43 30 | 48 20 |
| 135 | 27" | 2 14 | 4 28 | 6 42 | 8 56 | 11 10 | 13 24 | 15 38 | 17 52 | 20 06 | 22 20 | 24 34 | 26 48 | 31 16 | 35 44 | 40 12 | 44 40 |
| 145 | 25" | 2 5 | 4 9 | 6 13 | 8 18 | 10 23 | 12 27 | 14 31 | 16 35 | 18 40 | 20 45 | 22 50 | 24 54 | 29 03 | 33 12 | 37 21 | 41 30 |
| 155 | 23" | 1 57 | 3 52 | 5 49 | 7 46 | 9 43 | 11 40 | 13 36 | 15 32 | 17 29 | 19 25 | 21 22 | 23 17 | 27 10 | 31 02 | 34 54 | 38 45 |
| 165 | 22" | 1 49 | 3 38 | 5 27 | 7 16 | 9 05 | 10 54 | 12 43 | 14 32 | 16 21 | 18 10 | 20 | 21 48 | 25 26 | 29 04 | 32 42 | 36 20 |
| 175 | 21" | 1 43 | 3 26 | 5 9 | 6 52 | 8 35 | 10 28 | 12 11 | 13 54 | 15 37 | 17 20 | 19 03 | 20 46 | 24 12 | 27 38 | 31 4 | 34 30 |
| 185 | 20" | 1 38 | 3 15 | 4 53 | 6 30 | 8 08 | 9 45 | 11 23 | 13 | 14 37 | 16 15 | 17 53 | 19 30 | 22 45 | 26 | 29 15 | 32 30 |
| 195 | 19" | 1 33 | 3 05 | 4 38 | 6 10 | 7 43 | 9 15 | 10 48 | 12 20 | 13 53 | 15 25 | 16 58 | 18 30 | 21 35 | 24 40 | 27 45 | 30 50 |

U.S. Patent Pending Serial N°. 09/852,309

| AIRCRAFT | Type | | Number | | | | | Tachry out Time out | | | | | | in in | | | | Log Time Log Time | | | | | | INTERNATIONAL NAVIGATION LOG | | | | | |
|---|---|---|---|---|---|---|---|---|---|---|---|---|---|---|---|---|---|---|---|---|---|---|---|---|---|---|---|---|
| Check Points (fixes) | VOR - Navaids | | RADIO FREQ | WIND | | HEADING | | | | | COURSE | ALTI TUDE | DIST | SPEED | | | | TIME OFF | | | | GPH | XPDR | AIRPORT & ATIS: | | | | TEMP |
| | Freq | Bearing | | Dir. | Vel. | TC | TH | MH | CH | | | | A.S | G.S | | | | ETA | | | FUEL | | Elevation | RUNWAY | WIND | | CEI | Dew |
| | Ident | T/F | | Temperature | | -L/+R | -E/+W | +/- | | (Route) | FL | LEG | CAS | EST | ETE | ATE | ETA | ATA | | REM | Squawk | MSL | Altimeter | WIND Direction | LING | Point |
| | | | | | | WCA | VAR | Dev | | | | REM | TAS | ACT | | | | | | | | | Pattern | setting | Velocity | Visibility | |

NAVIGATION PLOTTER

FIELD OF THE INVENTION

This invention relates to a hand-held navigation plotter or "PLOT'TIMER" for use with a marine or aeronautical chart. The plotter is in the form of a thin plastic straight edge containing visually readable scales corresponding to the scales of the charts. By placing the plotter on the chart, course and distance problems, as well as, time, rate, and fuel burn may be solved for any trip.

BACKGROUND OF THE INVENTION

Travel, by any means, includes the elements of planning and execution. Because of the ever changing conditions encountered during the execution phase, the plan must be continually changed to accommodate the unplanned conditions and reach a successful conclusion.

In marine and aeronautical travel, a detailed plan is usually completed before departure. The plans may have a standard format and include all the known variables that may affect the trip. The plans are completed using the latest information available concerning such things as the tides, currents, weather, wind, traffic etc. Also, the planning is partly based on performance data of the vehicle that does not necessarily reflect the current capabilities of the ship. Therefore, the plan represents a theoretically perfect voyage that begins at a certain time and place and ends at a certain time and place.

However, as soon as the starting time has passed the reality of the situation begins to change the theoretical. Once the ship has cast off or the airplane has taken off, the crew is responsible for the safe completion of the trip and making all corrections to adjust for real-time changed conditions not allowed for in the plan. To accomplish this objective, the ships are properly equipped and the crews are properly trained.

The ships, both air and water, are of two types. There are crewed vehicles and there are vehicles operated by a single person. Clearly, the crewed vessel has the advantage of allowing one person to control the vehicle while others solve problems as they arise. In the single-handed operation, one must maintain control of the vehicle while making the required changes to the plan. Regardless, of the number of people involved, a quick, timely, and correct answer must be forthcoming to avoid further damage to the plan and, possibly, the participants.

DESCRIPTION OF THE PRIOR ART

A conventional plotter in wide spread use, by pilots, is a clear plastic straight-edge with a 180 degree compass rose on one side. The straight-edge is used to make the course line on a chart and measure the distance. The compass rose is placed on the latitude or longitudinal lines of the chart to determine the true course.

A similar plotter is disclosed in U.S. Pat. No. 4,190,960, issued Mar. 4, 1980 to Warner. This plotter has a circular disk rotatably mounted on the body of the plotter with 360 degrees marked thereon. The disk must be rotated to determine the compass course of the flight path.

A rotary slide ruler is usually used in conjunction with these plotters to determine time, rate, distance and fuel questions.

Acetate film jackets and envelopes are used to cover or house charts and allow information to be entered on tables present on the acetate.

There are various lap boards, including several scales and tables, that may be supported by the legs of the pilot or helmsman. These devices have been reduced further to a knee board that may be strapped about a leg of the captain.

Small hand-held electronic computers have also come into use for solving navigation/fuel problems.

All of these devices require coordinating information from different sources, sequentially, and applying that information to yet another set of references or devices to get a solution. The amount of time and attention necessary for performing these tasks, as well as, the time required for organizing the different implements takes away from the concentration needed to control the craft.

What is lacking in the prior art is a simple hand-held navigation plotter, with no moving parts, that can be placed on a chart and determine time, rate, distance, course and fuel requirements visually, without calculations.

SUMMARY OF THE INVENTION

Accordingly, it is an objective of the instant invention to provide a simple hand-held navigation plotter to be placed on a navigation chart to determine distance and course, visually.

It is a further objective of the instant invention to provide a hand-held plotter including tables, used in conjunction with a timepiece or stop watch to determine speed and time.

It is yet another objective of the instant invention to provide a plotter with structure capable of measuring an arc or a segment of a circle.

It is a still further objective of the invention to provide a plotter used in conjunction with the fuel flow instruments to determine fuel requirements.

It is a further objective of the invention to provide a plotter that can be manipulated with one hand to determine time, rate, distance, course, and fuel needs visually or with simple calculations.

It is another objective of the invention to provide a plotter for use in VFR and IFR conditions.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

BRIEF DESCRIPTION OF THE FIGURES

FIG. 5 is a table that can be used with the plotter; and

FIG. 6 is a International Flight Log used with the "PLOT'TIMER."

DETAILED DESCRIPTION OF THE INVENTION

Figure 4:
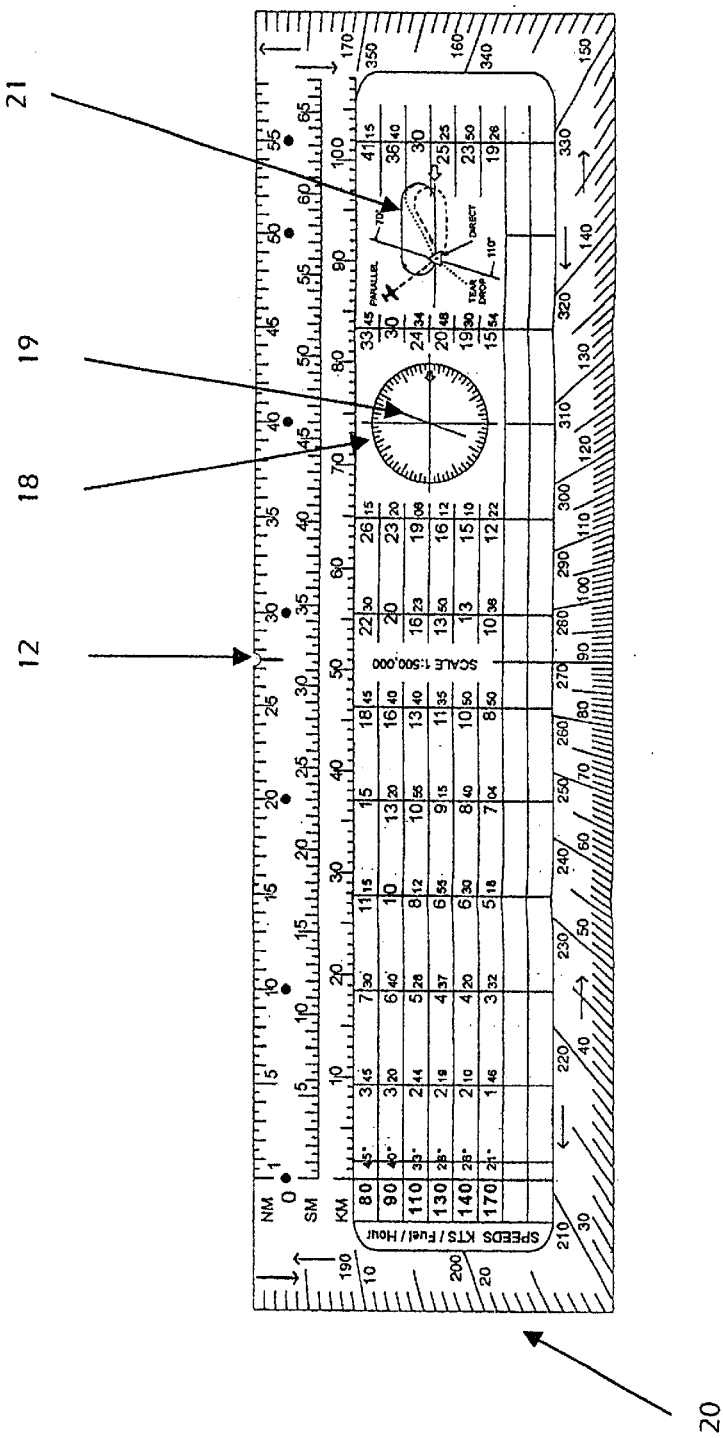
FIG. 4 illustrates another embodiment of the plotter with a compass rose.

The navigation plotter 10 is made of a thin, flexible weight, plastic with a printed distance scale 11 in both statute miles and nautical miles on one straight-edge border. The scale may include kilometers, as well (as shown in FIG. 4). When placed on a navigation chart, the plotter, which is preferably transparent, does not obscure any information on the chart. This distance scales are comparable to the 1:500,000 scale used in official aeronautical charts. By drawing a line on a chart, representing the intended route of travel, the distance between two points may be read directly in standard units of measure.

As shown, the plotter 10 is scaled to measure distances of 55 nautical miles (NM). If the intended trip is farther than 55 NM, the plotter may be moved along the chart to make the route line and measure the total distance. Usually, check points are within the 55 NM range, for accuracy of navigation.

There are other commonly used sets of official charts, both aeronautical and marine, having scales of 1:1,000,000 and 1:250,000. If these are being used, the measured distance given by the plotter is doubled or halved, respectively. Obviously, the plotter may be made with different scales that correspond to specific charts, e.g. Special IFR charts, to avoid any mental calculations. Alternatively, the plotter may be made in different sizes to accommodate larger distances or greater speeds.

However, independent of the charts, the statute and nautical milage scales also serve as a conversion table between U.S. Gallons( statute miles) and Imperial gallons (Nautical miles), in the case of fuel questions. The nautical milage and kilometer scales can serve to convert U.S. gallons, with 2 NM equaling 1 gallon, and liters, with kilometers read as liters.

Figure 2:
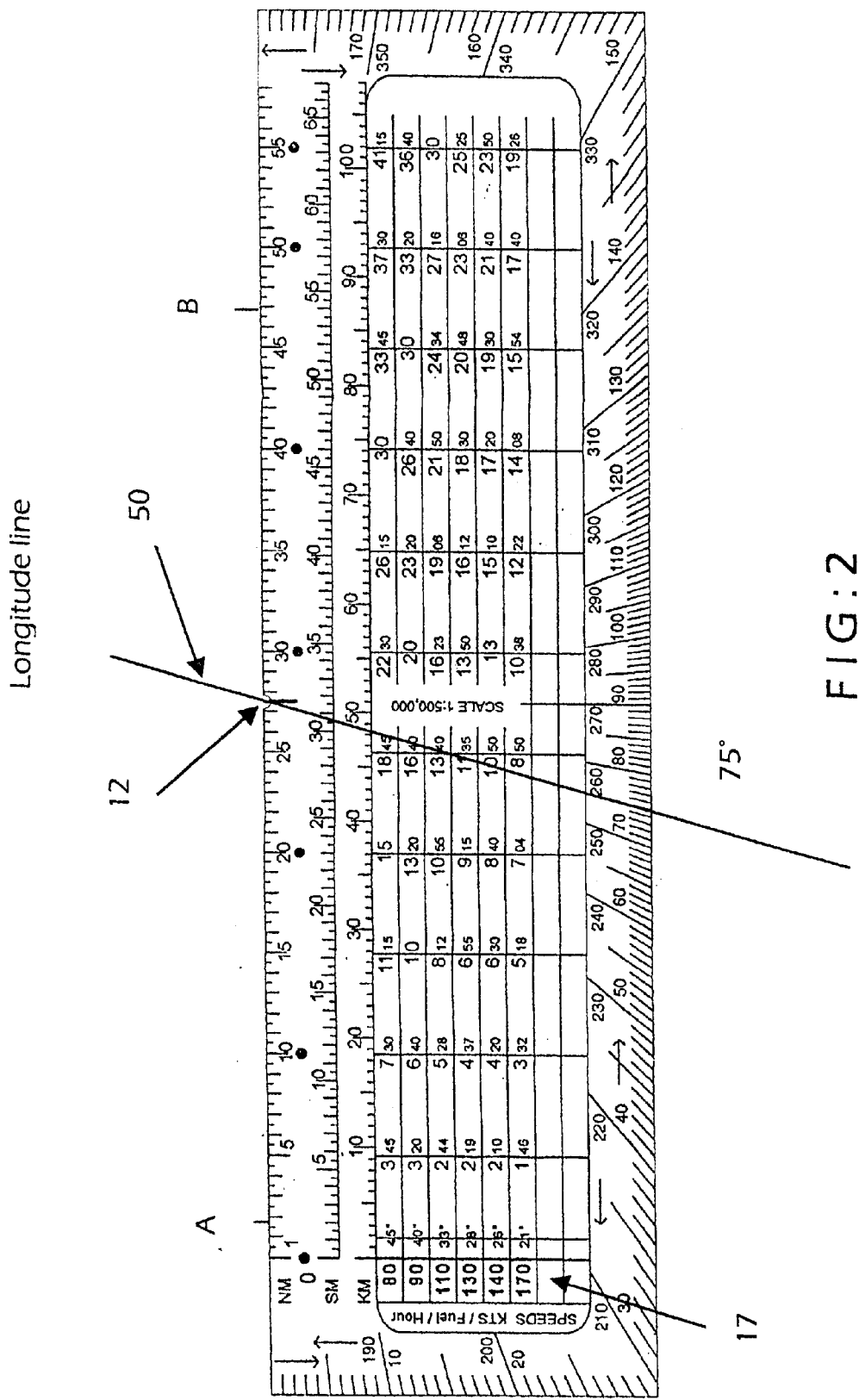
FIG. 2 shows the plotter superposed a longitude line of a chart.

The plotter has a reference point or indentation 12 in the straight-edge at the mid-point. About the periphery of the plotter, with the exception of the border containing the distance scales, there are angular markings 13 corresponding to the degrees of a compass rose. The protractor has an inner scale 14 and an outer scale 15 representing reciprocal compass courses or courses 180 degrees apart. If the route is easterly the outer scale 15 is used and if the route is westerly the inner scale 14 is correct. Once the line of travel has been put on the chart, the straight-edge of the plotter is slid along the line, using one hand, until the reference point or indentation 12 overlies a line of longitude 50 on the chart. The direction of travel is then read where the line of longitude 50 crosses the compass rose marking 13, as shown in FIG. 2. If the course is easterly, the outer scale 15 is read indicating a course of 75 degrees. If the course is westerly, the inner scale 14 indicates a course of 255 degrees.

In some instances, the route line may not cross a longitude line on the chart. Of course, the route line may be extended until it does cross a longitude line or parallel longitude lines may be drawn on the chart to intersect the route line, then the course is read as described above.

Figure 3:
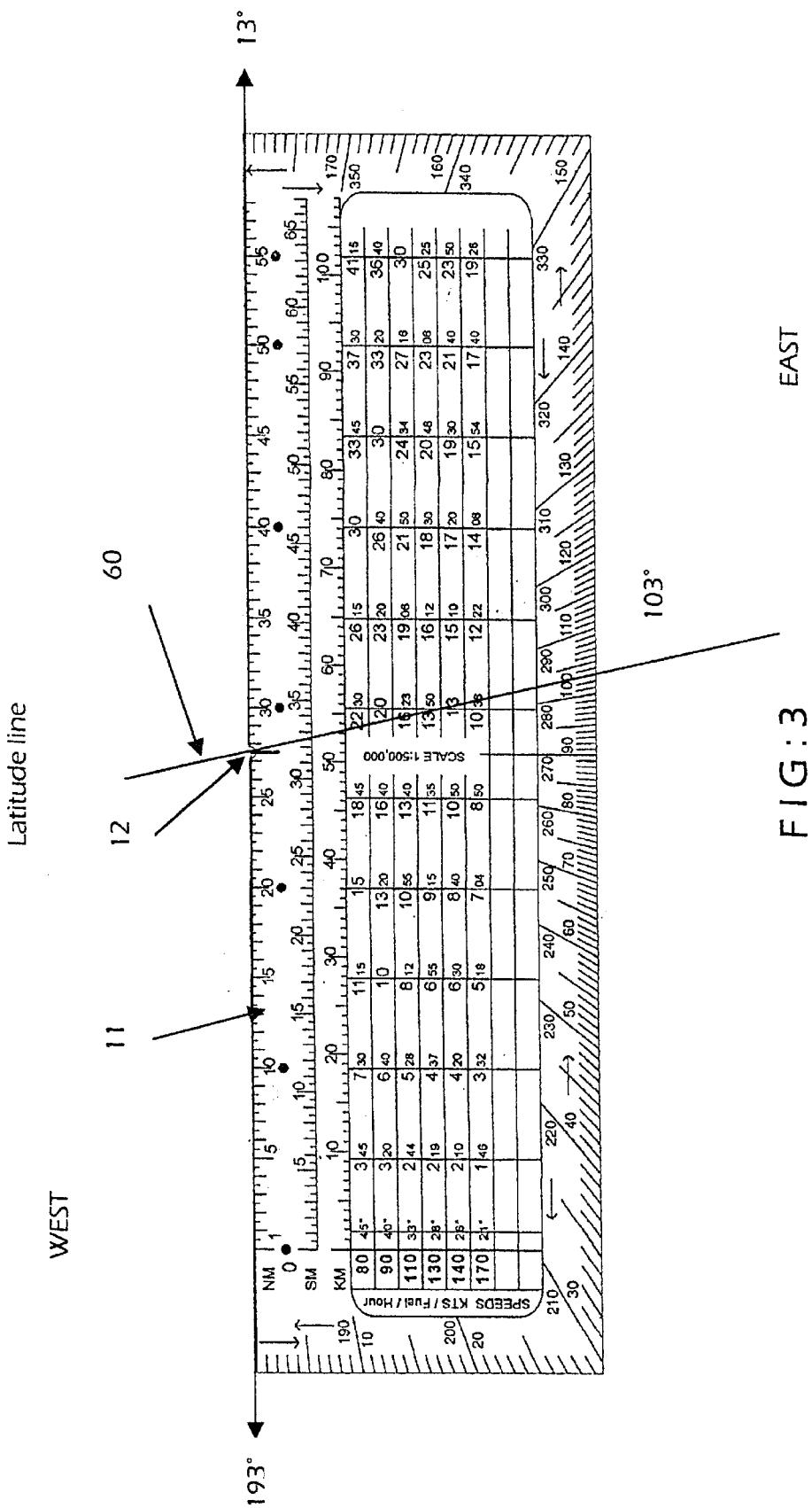
FIG. 3 shows the plotter superposed on a latitude line of a chart.

However, an alternative procedure may be used. The reference point or indentation 12 may be placed over a line of latitude 60 with the straight-edge on the route of travel. If the route is to the NE, the plotter is placed on the right side (East side) of the course line and a direction is read where the latitude line 60 crosses the outer scale of the protractor. This is shown in FIG. 3 as 103 degrees. However, 90 degrees must be subtracted from this number to determine the true course of 13 degrees. In this example, if the route is to the SW, the latitude line 60 crosses the inner scale at 283 degrees which gives a true course of 193 degrees when 90 degrees are subtracted.

If the route is to the NW, the plotter may be placed on the left side (West side) of the route line and the indentation 12 is placed on a line of latitude. A number is read at the point the latitude line crosses the inner scale of the protractor, e.g. 260 degrees. Add 90 degrees to this number to get the true course of 350 degrees. If the same route is to the SE, the point of crossing is read on the outer scale as 80 degrees giving a true course of 170 degrees by adding 90 degrees.

After determining the checkpoints, the distance between checkpoints, the true course between checkpoints, solely by reference to the chart and the PLOT"TIMER, this information is recorded on the appropriate lines of the International Flight Log. With this information, the estimated time in route and estimated time of arrival (ETA) can be determined along with the estimated fuel requirements.

The steps described above are illustrative of methods for finding the true course of a route of travel. However, the plotter may be used in directly opposed orientations and calculations to arrive at the same solutions. Further, some navigators may use a combination of the described steps and the directly opposed steps to solve true course problems.

On the straight-edge of the plotter 10 there are apertures 16 at the ten nautical mile markings. These apertures may be used to measure distances in an arc about a point. A pin or writing pen or other small peg may be placed in one aperture at a starting point on the chart. Another pin or pen may be placed in a second aperture and the plotter rotated about the first point, a measured arc can be drawn or visualized by determining the location of the second aperture during rotation.

To use the plotter for determining total time in route or time for a segment of a route, a speed across the surface must be known from independent information. Usually, ground speed or distance made good is determined by using airspeed or knots to estimate the time to go a measured distance between geographic checkpoints. Once the checkpoints have been reached, the real time is compared to the estimated time. The ground speed is then adjusted up or down from the vehicle speed based on whether the real time was less or more than the estimated time. For example, if the airspeed is 180 miles per hour (mph) and the checkpoints are 30 statute miles apart, the trip is estimated to take 10 minutes. If it takes 5 minutes, the ground speed is 360 mph and if it takes 20 minutes the ground speed is 90 mph. Usually, navigation logs or flight plans, such as the International Flight Log shown in FIG. 6, have various checkpoints designated on the route line and in a schedule. The navigation logs and flight plans have spaces to enter the elapsed time between each checkpoint thereby keeping a running account of the ground speed in each segment of the trip.

Figure 1:
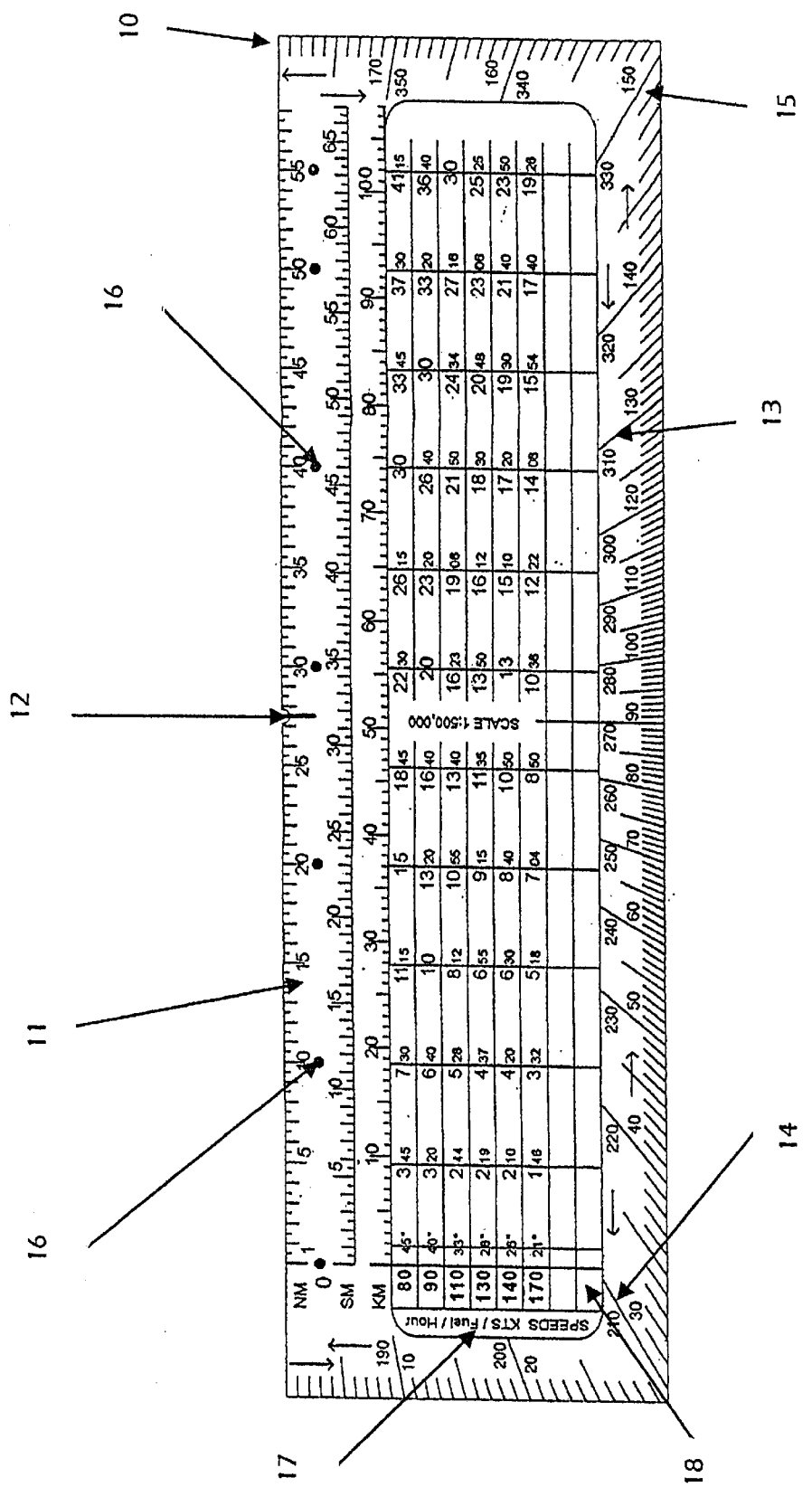
FIG. 1 illustrates a perspective of the plotter showing the scales and tables.

For purposes of illustration, using his stop watch, if the pilot flies a 10 NM segment in 5 min. 28 sec., by reading directly under 10 NM, 5' 28" a ground speed of 110 kts can be determined. The air speed indicator has indicated 120 kts during the trip between the checkpoints which means there is a 10 kt headwind component. The next checkpoint is read off the chart as 45 NM away. The table 17 shows a vertical column of numbers (x axis)that may be read as speed in knots, i.e. 80 kt, or fuel in gallons per hour, i.e. by dividing by 10 or 8.0 gals. The horizontal numbers (y axis)in the table represent time in minutes and seconds. The horizontal numbers in the y axis are aligned with the milage numbers in the milage scale, as shown in FIG. 1. The table 17 has a column of small numbers adjacent to the speed numbers. This column represents the time in seconds it takes to burn 1.0 gallon of fuel or to travel 1 NM.

The table 17 also has blank lines 18 at the bottom of the vertical column of speed numbers. These blanks may be used to record the specific speed and times for a particular aircraft or vessel.

For this example, the 110 knot ground speed will take 24 minutes 35 seconds to reach the next checkpoint. This is visualized by following the 110 speed line horizontally to the 45 NM line on the straight-edge.

To determine the amount of fuel required for this same segment, the navigator/pilot must know the fuel flow of the craft. In airplanes, the fuel flow usually varies with altitude or fuel/air mixture and power settings. Once a flight is stabilized at a particular altitude and power, the fuel flow will remain constant. This fuel flow may be read directly from a fuel flow meter or found in various tables carried with the airplane. In this example, the known fuel flow is 9 gallons per hour and the time already determined from the plotter is 24 minutes and 35 seconds (24' 34").

Now, the vertical column of numbers are read as 8–17 gallons per hour and the straight-edge milage numbers are read as gallons. The adjacent column of numbers shows that the fuel burn is 0.1 gallon per 40 seconds or 1 gallon every 6 minutes 40 second. By reading horizontally along the 9 gallon per hour (gph) line to find the allotted time (24' 35"), it can be seen that the time falls between 23' 20" and 26' 40" and the fuel necessary for this segment is between 3.5 and 4.0 gallons on the straight-edge.

There are several ways that a more exact answer can be interpolated. By merely visualizing a line, representing 24' 35", between the two given times, the fuel may be read directly off the plotter. By referring back to the adjacent column of numbers, it can be determined that for each 40 seconds another 0.1 gallon is used. Mathematically, this makes the requirement approximately 3.7 gallons. Of course, the plotter may be used with other simple interpolations, e.g. 24' 35" lies between 23' 20" and 26' 40" in the 9 gph line making the space equal to 3' 20" or 200". The pilot can look at the plotter and see that half the space or 100" will be 25' or 25" too much and equal 3.75 gallons. The estimate would round down to 3.7 gallons.

The total fuel required for a trip is the sum of the amounts required for each segment. The fuel may be figured in liters and liters per hour by using the speed numbers 80–170 directly as liters/hour and the straight-edge numbers directly as 0–55 liters.

Using the plotter, as explained above, other navigational problems may be solved such as, estimated time of arrival, total time in route, and total fuel necessary. If a diversion from the intended destination is required, for any reason, the plotter may be used as described above to quickly determine, with one hand, the true course of the diversion, the time required and the fuel required for the new destination.

In FIG. 4, the IFR (Instrument Flight Rules) embodiment of the plotter is shown. The structure of the plotter, as well as, scales and tables are the same as those shown in FIG. 1. The compass rose 18 can help in solving any position problem in VFR or IFR conditions. By superposing the compass rose on a chart, it is possible to convert wind direction, in degrees, to wind direction relative to the course or airplane. It is also possible to use the compass rose to determine the relative bearing of a navigational fix or point in relation to the airplane's position.

The compass rose has a reference line 19 which is used to determine the type of entry to be used in entering a holding pattern. There are three possible entries to a holding pattern, i.e. direct, parallel and teardrop. The correct entry is based on the aircraft position relative to the navigation fix and holding course to be used in the holding pattern. An arbitrary imaginary reference line is drawn through the fix at a 70 degree angle to the holding course creating four quadrants. Based on where the aircraft is located in these four quadrants, a particular entry is chosen for maneuvering the aircraft to enter the holding pattern. All this must be visualized in the pilot's head, with accompanying mathematics, to arrive at a heading to fly once the holding fix is crossed. Using plotter 20, the reference line 19 is placed across the course line and holding fix automatically depicting the quadrant the aircraft is in. The pilot then knows the entry to use and the heading to fly when the fix is crossed.

This embodiment is to be used with IFR Approach Charts that provide certain information, such as distance between the Initial Approach Fix (IAF) or Final Approach Fix (FAF) and the Missed Approach Point (MAP)and elapsed time at specific ground speeds. These distances are relatively short, usually 4 to 7 NM and the times are correspondingly short. However, the speed/time given in the approach chart is ground speed and not air speed. But the pilot must fly a particular air speed to make a standard landing. So the pilot needs a quick reference to convert the airspeed being flown to the comparable approach chart ground speed to determine the time between the two fixes. For example, an approach chart may give the distance between the FAF and the MAP as 4 NM and the time at 90 kt. as 2 minutes 40 seconds. This speed is used because the aircraft must be at 90 kts, airspeed, at the MAP to make a proper landing on the runway. But, using the example above, 120 kts airspeed was 110 kts ground speed or a 10 kt head wind. Substracting the head wind component from the 90 kts airspeed gives 80 kts ground speed from the FAF to the MAP. Glancing at the plotter, the adjacent column of numbers in the table 17 indicates that at 80 kts it takes 45 seconds to cover a nautical mile. Therefore, 45×4 is 180 seconds or 3 minutes between fixes at 90 kts indicated airspeed.

The table 17 may be the same as in the VFR (Visual Flight Rules) plotter shown in FIGS. 1–3 or generally slower speeds may be used with comparable times.

Between the 45 NM and 55 NM columns, a standard holding pattern 21 is presented with proper entry procedures. This is a visual reference to the pilot when approaching a holding fix to determine which entry to use and the corresponding courses to fly to establish the aircraft in the holding pattern. The standard holding pattern requires right turns to remain in the pattern. If a non-standard holding pattern (left turns) is necessary, the plotter may be flipped over to read from the back side.

FIG. 5 shows a table which may be included with the plotter giving a broader range of speeds, from 75 through 185, and distances, 1 through 100. This table may be printed on any medium, preferably plastic, and have an adhesive backing for mounting in a vessel.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

What is claimed is:

1. A navigation plotter for use with a chart having lines of latitude and longitude to determine distance, true course, speed, and fuel requirements for a trip, said plotter comprising a one piece, thin, light weight, plastic with a periphery including at least one straight-edge, said straight-edge having visible distance scales thereon, a reference point at the mid-point of said straight-edge, the remainder of said periphery having angular markings representing the degrees of a compass rose, said reference point being the center of said compass rose, said reference point being an indentation in said straight-edge, whereby said distance scales on said straight-edge designate the distance between two points and said angular markings indicate the true course when said reference point is placed on a line of longitude on said chart.

2. A navigation plotter of claim 1 further comprising a visual table located within said periphery, said table having an x axis and a y axis, said x axis having a plurality of integers representing speed, said y axis aligned with said distance scales, said y axis having a plurality of integers representing corresponding times whereby said y axis can be read in conjunction with said distance scales as time to travel a given distance at a given speed.

3. A navigation plotter of claim 2 further comprising said plurality of integers in said x axis representing fuel burn in gallons per hour and said distance scales representing a corresponding number of gallons whereby said distance scales can be read as the number of gallons burned at a given speed during a specific time.

4. A navigation plotter of claim 2 further comprising blank spaces in said x axis and said y axis of said table for inserting corresponding information for a particular vehicle.

5. A navigation plotter of claim 1 further comprising a plurality of apertures in said distance scales whereby said plotter can designate a measured arc about a point defined by two of said plurality of apertures.

6. A navigation plotter of claim 1 further comprising said distance scales including markings designating nautical miles kilometers and statute miles.

7. A navigation plotter of claim 1 further comprising each of said angular markings defined by inner and outer sets of numbers, said inner and outer sets of numbers defining a compass rose, said inner and outer sets of numbers being reciprocals.

8. A navigation plotter for use with a chart having lines of latitude and longitude to determine distance, true course, speed, and fuel requirements for a trip, said plotter comprising a one piece, thin, light weight, plastic with a periphery including at least one straight-edge, said straight-edge having visible distance scales thereon, a reference point at the mid-point of said straight-edge, the remainder of said periphery having angular markings representing the degrees of a compass rose, said reference point being the center of said compass rose, further comprising said compass rose with a 70 degree reference line, said compass rose adapted to visually determine proper holding pattern entry, whereby said distance scales on said straight-edge designate the distance between two points and said angular markings indicate the true course when said reference point is placed on a line of longitude on said chart.

9. A navigation plotter for use with a chart having lines of latitude and longitude to determine distance, true course, speed, and fuel requirements for a trip, said plotter comprising a one piece, thin, light weight, plastic with a periphery including at least one straight-edge, said straight-edge having visible distance scales thereon, a reference point at the mid-point of said straight-edge, the remainder of said periphery having angular markings representing the degrees of a compass rose, said reference point being the center of said compass rose, whereby said distance scales on said straight-edge designate the distance between two points and said angular markings indicate the true course when said reference point is placed on a line of longitude on said char, said plotter including a depiction of a holding pattern, said depiction including a holding fix, a holding course and proper maneuvering courses to enter a holding pattern, said depiction having a 70 degree reference line through said holding course and said fix whereby a proper maneuvering course may be visually selected.

10. A navigation plotter of claim 9 further comprising a compass rose with a 70 degree reference line, said compass rose adapted to visually determine proper holding pattern entry.

* * * * *